United States Patent [19]

Bordelon et al.

[11] Patent Number: 4,472,602
[45] Date of Patent: Sep. 18, 1984

[54] TELEPHONE SET WITH TRANSDUCER/RINGER

[75] Inventors: Chester M. Bordelon; Jack L. Cain, Jr., both of Shreveport, La.

[73] Assignee: AT&T Technologies, Inc., New York, N.Y.

[21] Appl. No.: 522,280

[22] Filed: Aug. 11, 1983

[51] Int. Cl.³ ............................................. H04M 1/26
[52] U.S. Cl. .................... 179/84 T; 179/103; 179/167
[58] Field of Search .............. 179/84 T, 84 R, 84 A, 179/81 R, 159, 168, 167, 100 D, 100 R, 103, 2 EB

[56] References Cited

U.S. PATENT DOCUMENTS

| | | | |
|---|---|---|---|
| 3,627,930 | 10/1971 | Tolman | 179/90 R |
| 4,124,785 | 11/1978 | Seretny et al. | 179/103 |
| 4,232,203 | 11/1980 | Lenaerts | 179/103 |
| 4,251,694 | 2/1981 | Taylor | 179/84 T |

*Primary Examiner*—Gene Z. Rubinson
*Assistant Examiner*—James L. Dwyer

*Attorney, Agent, or Firm*—R. F. Kip, Jr.

[57] ABSTRACT

There is disclosed a switch-hookless telephone set having a housing in the configuration of a handset housing, a cord, a plug and, within the housing, circuitry comprising: a ringing network including a ringing oscillator, a voice network, a receiver, a magnetic transducer performing during voice mode operation of the set as an electroacoustic transducer, and a bistable snap-action OFF-ON switch having an actuating button exposed outside the housing. The switch is coupled to the network and transducer so as, when in a first or "ringing mode" position, to connect the ringing network to, and disconnect the voice network from, the leads in the cord while connecting and disconnecting the transducer to and from, respectively, the ringing oscillator and the voice network, and so as, when in a second or "voice mode" position, to effect the converse connections and disconnections. When the transducer is connected to the ringing oscillator, the transducer is responsive to tone signals therefrom to emit ringing sounds.

11 Claims, 2 Drawing Figures

TELEPHONE SET WITH TRANSDUCER/RINGER

TECHNICAL FIELD

This invention relates generally to telephone sets and more particularly to arrangements for providing therefor an alerting or "ringing" sound in response to reception by such set of a ringing signal from the central office.

The invention will be described in terms of a switch-hookless telephone set which has neither any base with a cradle nor any switch hook actuated by the presence or absence of the weight of a handset on the cradle. The invention in one of its aspects is also, however, applicable to telephone sets having such a base, cradle and switch hook.

BACKGROUND OF THE INVENTION

Conventional telephone sets include as part of their equipment a ringer device or "ringer" which is separate from the other components of the set. The ringer is, together with associated ringer circuits, mounted on the base of the set and coupled to the telephone lines when the set is "on-hook" (i.e., the handset is resting in the cradle) so that the switch hook disconnects the handset from the lines. When a ringing signal is received from the central office, the ringer circuits respond thereto to supply to the ringer an electrical signal which is converted by the ringer into sound tones alerting the telephone subscriber that he or she is being called.

The ringer is, however, an item of expense in a telephone set. Accordingly, various proposals have been made to eliminate the ringer by using another component of the set to perform its regular function during voice mode operation of the set and, also, to provide the ringing sound when the set is in its ringing mode of operation. Thus, for example, U.S. Pat. No. 4,251,694 issued Feb. 17, 1981 in the name of Raymond G. Taylor and incorporated herein by reference discloses a telephone set having the usual base, cradle, switch hook and handset but which is arranged so that, while the telephone is "on-hook," a ringing signal from the central office actuates the handset receiver to produce a ringing sound. In connection with such an arrangement, however, the danger arises that, if a telephone user should hold the handset to his/her ear and then manually depress the cradle to put the set in "on-hook" condition, a ringing signal from the central office will be converted by the handset receiver into a ringing tone which may damage the ear of the user. To forestall such danger, the Taylor set includes a protective device which senses the presence or absence of the handset in the cradle whether it is depressed or not, and which permits the ringing tone to be produced by the handset receiver only when such device senses that the handset is indeed in its cradle.

While the Taylor set represents a significant advance in the art, it has the disadvantage that it requires the mentioned protective device which is an item of expense. Moreover, the arrangement disclosed in the Taylor patent is not adapted for use in a switch-hookless telephone set.

SUMMARY OF THE INVENTION

In contrast to the foregoing, the present invention in one of its aspects involves the use as a ringer of that component of the set which functions as the telephone transmitter when the set is in its voice mode of operation. Such aspect of the invention constitutes an improvement in a telephone set comprising a ringing network including a ringing oscillator, a receiver for converting first electrical signals into sounds, a transducer for converting sounds into second electrical signals when the set is in voice mode of operation, and a voice network operable during such voice mode for passing such first signals from the telephone lines to the receiver and such second signals to the lines from such transducer. The inventive improvement to such set comprises circuit means for connecting the ringing oscillator and the transducer in a circuit for applying to the mentioned transducer the electronic tone signal generated by the oscillator in response to reception of a ringing signal from the central office. The transducer is responsive to application of such tone signal to convert it into a ringing sound so as to act as an electroacoustic transducer as opposed to its normal role of acting as an acoustoelectric transducer during the voice mode operation of the set.

As another aspect of the invention the telephone set may be a switch-hookless set wherein the base and cradle of the set are eliminated and all the operating components of the set are housed in a housing similar to that of the handset of a conventional telephone set.

As still another aspect of the invention, the set may include a switch movable between first and second positions and adapted, when in said first position, to connect a transducer of the set to the ringing circuit while concurrently disconnecting the transducer from the voice network and, when in such second position, to effect the converse connection and disconnection.

BRIEF SUMMARY OF THE DRAWINGS

For a better understanding of the invention, reference is made to the following description of an exemplary embodiment thereof, and to the accompanying drawings wherein.

DETAILED DESCRIPTION OF EMBODIMENT

Figure 1:
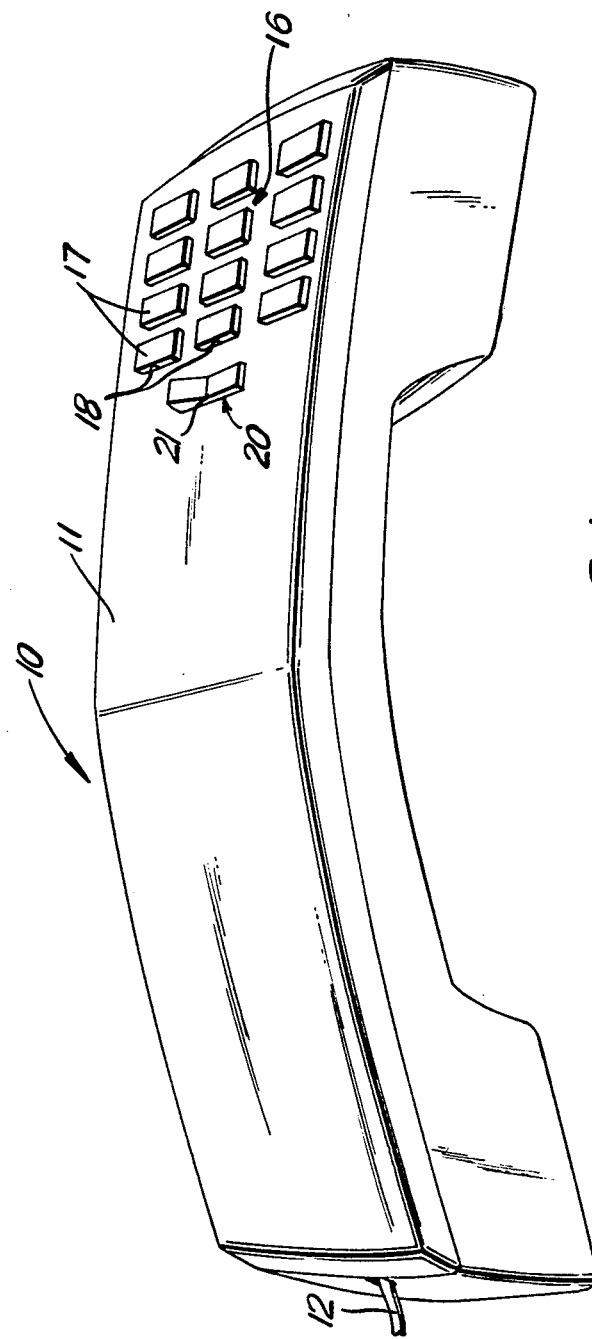
FIG. 1 is an isometric view of the exterior of a switch-hookless telephone set according to the invention.

Referring now to FIG. 1, the reference numeral 10 designates a switch-hookless telephone set comprising a housing 11 which is similar in form to the housing of the handset of a conventional telephone. Element 11 houses all of the other components of the set except for the set's cord 12 and, also, a modular plug 13 (FIG. 2) at the end of the cord and adapted by insertion into a modular telephone wall jack 14 to connect set 10 through telephone lines 15 to a central office (not shown). Included among such housed components is the bulk of a dial assembly 16 having resiliently biased buttons 17 projecting at the top side of housing 11 from its inside through apertures 18 in the housing to the outside of the housing so as to be manually depressible from the housing's exterior. Another of such housed components is the bulk of a switch 20 having exposed on the top housing 11 an actuating button 21 movable by finger pressure and by snap-action between first and second switch positions (hereinafter referred to for convenience as, respectively, the "OFF" and "ON" positions of the switch 20). When switch 20 has been switched to either of its two mentioned positions, it remains stably in that position to which it has been moved.

Housing 11 also includes two magnetic transducers 25 and 30 (FIG. 2) disposed within the housing at its right-hand and left-hand ends, respectively, and communicating with the exterior of the housing by respective sets of openings (not shown) formed in the bottom of the housing. Such openings may be as illustrated in U.S. Pat. No. 4,124,758 issued Nov. 7, 1978 in the name of S. E. Seretny for "Telephone Set" and incorporated herein by reference. Both transducers are preferably of the "MR" type disclosed in U.S. patent application Ser. No. 338,231 filed Jan. 11, 1982, now U.S. Pat. No. 4,443,667 for "Electromagnetic Transducer" in the name of Richard M. Hunt and assigned to Bell Telephone Laboratories, Incorporated, a subsidiary of the assignee hereof, such application being incorporated herein by reference. The type of magnetic transducer used, however, is not critical. Accordingly, transducers 25 and 30 may be of the "V" type disclosed in U.S. patent application Ser. No. 355,937 filed Mar. 8, 1982, now U.S. Pat. No. 4,425,482 in the name of C. M. Bordelon et al. for "Ring Armature Electroacoustic Transducer" and assigned to the assignee hereof, such application being incorporated herein by reference. Alternatively, they may be of the type disclosed in U.S. Pat. No. 2,506,624 issued May 9, 1950 in the name of R. E. Wirsching and incorporated herein by reference. Transducer 25 is used exclusively as an electroacoustic transducer for converting electrical voice-representative signals into sounds. Transducer 30 is, however, used during voice mode operations of the set as an acoustoelectric transducer to convert sounds into electrical voice-representative signals but, during ringing mode operation of the set, is used as an electroacoustic transducer to convert an electrical tone signal into a ringing sound. Such dual functioning of transducer 30 will be later explained in more detail. Transducer 25 has an impedance of about 300 ohms whereas transducer 30 has (for reasons later explained) a substantially higher impedance, e.g., about 3000 ohms.

Figure 2:
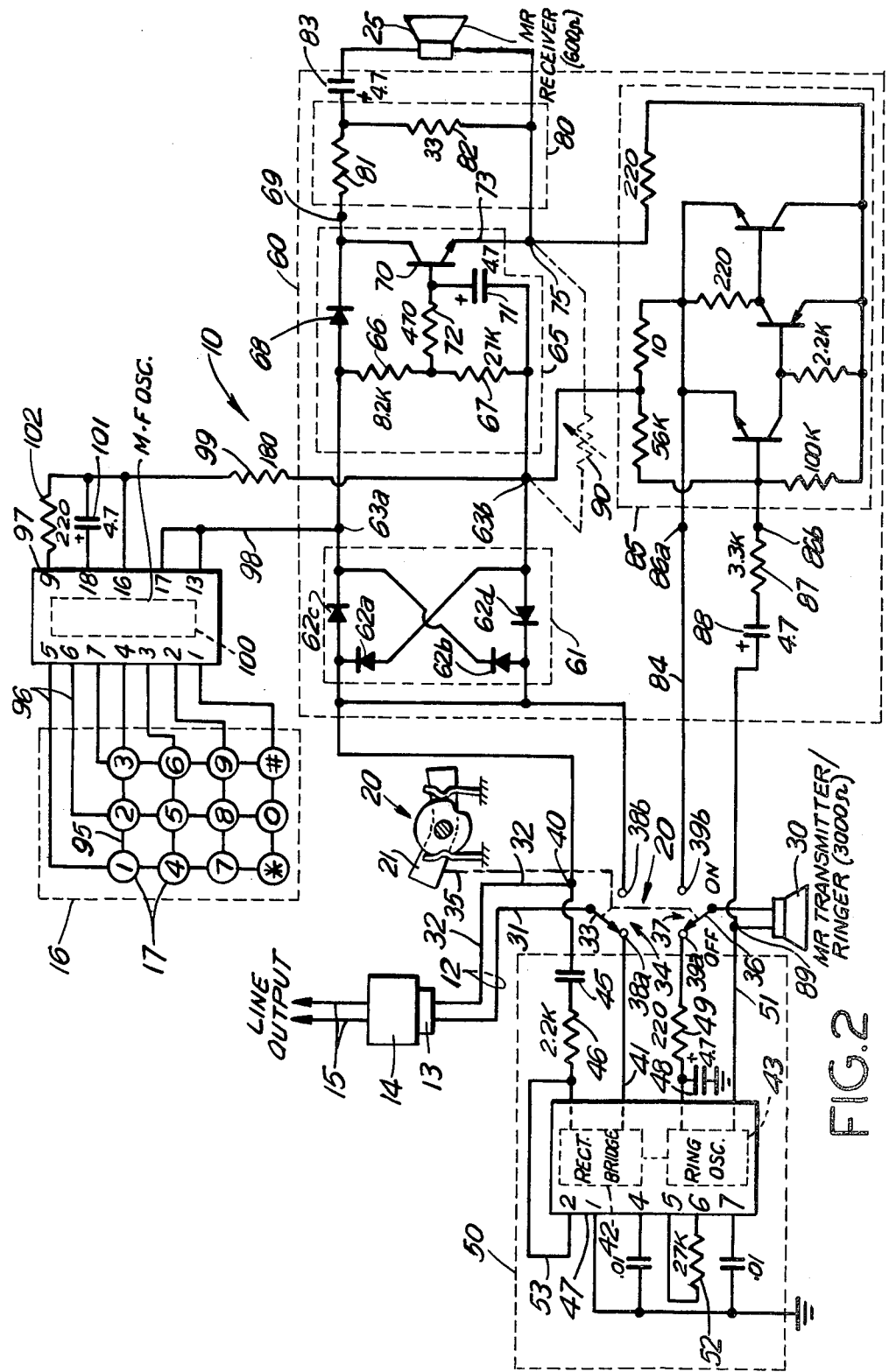
FIG. 2 is a schematic diagram of the circuitry of the FIG. 1 set.

Proceeding now to FIG. 2, the cord 12 for the set 10 includes two leads 31 and 32 which are referred to herein for convenience as "tip" and "ring" leads, respectively. That distinction is, however, somewhat meaningless because d.c. voltages supplied from the central office via lines 15 to set 10 may appear across leads 31 and 32 with either polarity.

Tip lead 31 is connected to a movable contact 33 disposed in a first switch section 34 of switch 20 to be mechanically coupled by a linkage 35 to switch button 21 also coupled by such linkage to a second movable contact 36 disposed in a second switch section 37 of switch 20. Switch section 34 includes left and right-hand fixed switch contacts 38a, 38b, while switch section 37 includes left and right-hand fixed switch contacts 39a and 39b. The ring lead 32 is connected to a junction 40.

Junction 40 is connected via a d.c. blocking capacitor 45 and a resistor 46 in series to pin 16 of a hybrid integrated circuit 47 which may be a Western Electric "502HY" circuit, and of which pin 15 is connected by lead 41 to fixed contact 38a to provide a return path for a.c. current flowing from junction 40 to pin 16. Circuit 47 includes a rectifier bridge 42 for rectifying such current and, also, a ringing oscillator circuit 43 adapted when energized by rectified current from such bridge to generate between pins 14 and 8 of circuit 47 an electrical tone signal which is filtered by a capacitor 48 connected between pin 14 and ground. Such tone signal is applied from the ring oscillator to transducer 30 by circuit means which connects such oscillator and transducer in a loop circuit. That circuit means comprises a resistor 49, fixed contact 39a, and movable contact 36 (when engaging contact 39a) for providing flow of the signal current between one terminal of transducer 30 and pin 14, and such circuit means further comprises a lead 51 for providing flow of such current between the other terminal of transducer 30 and pin 8. The mentioned ring oscillator 43 may be of a well known type which generates a tone having a slow variation in frequency such that transducer 30 responds to such signal to produce a ringing which is in the nature of a warble having a center frequency determined by the value of the shown resistor 52 connected between pins 5 and 6 of circuit 47, and having a "warbling" variation in frequency determined by the resistance in the shown circuit path 53 (here a short circuit) connecting pins 2 and 16 of circuit 47. The choice of the type of ringing oscillator used is not critical. Accordingly, the described rectifier bridge and ringing oscillator in circuit 47 may be replaced by the rectifier bridge and ringing oscillator disclosed in the aforementioned Taylor U.S. Pat. No. 4,251,694. While the sound output of transducer 30 has been referred to as a "ringing sound," by the use of that term herein, it is not meant to imply that the sound be like the ringing of an alarm bell or gong. Rather, it is intended that the term "ringing sound" as used herein include in its meaning a warble or any other sound which will alert a user of the described telephone set that such user is being called.

The hybrid integrated circuit 47 and circuit elements associated therewith together constitute a ringing network 50 cooperable with switch 20. Also cooperable with that switch is a voice network 60 of which details are as follows.

The mentioned junction 40 and switch contact 38b are connected to, respectively, the "high" and "low" input terminals of a rectifier bridge 61 within voice network 60. Bridge 61 consists of four diodes 62a–62d arranged as shown in FIG. 2. Connected to the "high" and "low" output terminals 63a and 63b of bridge 61 is a constant current transistor circuit 65 comprising resistors 66 and 67 connected in series to form a voltage divider connected between terminals 63a, 63b, a diode 68 having its anode end connected to terminal 63a and its cathode end connected both to a terminal 69 for circuit 65 and to the collector of a transistor 70 in such circuit, an a.c. by-pass capacitor 71 and a resistor 72 connecting the base of such transistor to, respectively, terminal 63b and the junction in the mentioned voltage divider of resistors 66, 67, and, lastly a lead 73 connecting the emitter of transistor 70 to another terminal 75 for constant current circuit 65. It is to be noted that the circuit 65 and its associated connections is not the joint invention of the inventors hereof.

The terminals 69 and 75 of the constant current circuit 65 are connected to a side tone limiting circuit 80 comprising resistors 81 and 82 connected in series across such terminals. The junction of such resistors is connected by a d.c. blocking capacitor 83 to one side of transducer receiver 25 of which the other side is connected to the mentioned terminal (or junction) 75.

Junction 75 is connected to the "high" side of a three-stage semiconductor transistor amplifier 85 of which the low side is connected to the output terminal 63b of the rectifier bridge 61 otherwise known as a "polarity quad." Amplifier 85 has input terminals 86a, 86b of which 86a is connected by lead 84 to the fixed contact 39b of switch 20, and 86b is connected by resistor 87 and d.c. blocking capacitor 88 in series to a junction 89 connected to lead 51 and to one side of transducer 30. The other side of such transducer is connected to movable contact 36 in the second section 37 of switch 20. It follows that, when such movable contact is positioned to engage fixed contact 39b, transducer 30 will be connected for a.c. current flow across the input terminals 86 of the amplifier 85. In these circumstances, amplifier 85 may be considered to be replaced by an electrical equivalent in the form of a variable resistor 90 (e.g., a carbon microphone) which is connected between terminals 75 and 63b (such variable resistor being shown in FIG. 2 in phantom), and the resistance value of which resistor 90 is controlled by transducer 30.

As indicated in FIG. 2, the dial assembly 16 includes a matrix 95 constituted of conductive paths and underlying the push buttons 17 and connected by output conductors 96 to a hybrid intergrated circuit 97 which may be a Western Electric "677F" circuit. The buttons 17 when depressed against their resilient bias will contact the conductive paths in matrix 95 so as, in a well known manner, to cause the appearance on conductors 96 of signal combinations which are different from each other and respective to the buttons 17, and of which each such combination consists of separate signals on separate of such conductors. These signal combinations are supplied with circuit 97 to a conventional multifrequency oscillator means 100 responsive to each such signal combination to generate a different electrical multifrequency tone signal consisting of two tone frequencies, there being a different combination of such two frequencies for each such tone signal. The various multifrequency tone signals so generated are applied between the terminals 63a, 63b of the polarity quad circuit 61 by the connections shown between these terminals and the circuit 97. Those connections include a lead 98 connecting terminal 63a to pins 13 and 17 of circuit 97, and they include also a resistor 99 connected at one end to terminal 63b and connected at its other end to (a) pin 16 of circuit 97, (b) pin 18 of such circuit through a capacitor 101, and (c) pin 9 of such circuit through a resistor 102.

OPERATION

Assume, to begin with, that set 10 is plugged to telephone lines 15, and switch 20 is at its first or OFF position, lines 15 being quiescent. For that quiescent condition, d.c. voltage at a maximum of 48 volts is furnished from the central office over the lines to appear across leads 31, 32 of the telephone cord 12. As later explained, the polarity of such voltage doesn't matter. Movable contact 33 of switch 20 is closed at this time with its fixed contact 38a, but capacitor 45 prevents the flow of d.c. current to integrated circuit 47. Hence, such d.c. voltage does not reach the ringing network 50. Moreover, since movable contact 33 is open with respect to fixed contact 38b, such d.c. voltage does not power the voice network 60.

Assume now that the central station sends over lines 15 to telephone set 10 a 90 volt 20Hz ringing signal. The corresponding a.c. current flows from leads 32, 31 to integrated circuit 47 through circuit paths including, on the one hand, junction 40 and elements 45, 46 and, on the other hand, contacts 38a and 33 of switch 20. Within circuit 47, such a.c current is full-wave rectified by rectifier bridge 42 and such current is then supplied to power the ring oscillator 43 in circuit 47. The ring oscillator responds to such powering to produce for the term of the ringing signal the described warbling electrical tone signal. That signal appears across pins 14 and 8 of circuit 47 so as to produce a corresponding flow of current through the circuit connected between these pins and including resistor 49, fixed contact 39a, movable contact 36 (which is now closed with contact 39a), the coil of magnetic transducer 30, junction 89 and lead 51. The flow of such a.c. current through the coil of transducer 30 drives the armature thereof to vibrate the diaphragm of the transducer so as to cause it to emit a ringing or alerting sound in the nature of a warble. Thus, when telephone set 10 is in its ringing mode of operation by the maintaining of switch 20 in its OFF position, transducer 30 operates as an electroacoustic transducer. The warble sound is produced by transducer 30 each time a ringing signal is applied from the central office to set 10.

After one or more rings, the user of the telphone set is alerted that a call is being made, and the user accordingly manipulates snap-action switch button 21 by finger to move switch 20 from its first or OFF position to its second or ON position to thereby place set 10 in its voice mode of operation. That change in switch position has a number of effects as follows.

The closing of movable contact 33 with fixed contact 38b connects the d.c. powering voltage on leads 31, 32 to the input of polarity quad 61. If such voltage is of a polarity such that lead 31 is positive with respect to lead 32, the quad 61 will operate to cause the voltage at its output terminal 63a to be positive in respect of output terminal 63b of the quad. If, however, the d.c. voltage on leads 31, 32 is of opposite polarity, quad 61 will so operate that the voltage on terminal 63a is still positive with respect to terminal 63b. Accordingly, although quad 61 has the circuit configuration of a rectifier bridge, it does not operate in set 10 as a rectifier of a.c. current but, instead, as a polarity reverser (when necessary) of d.c. curent.

While the d.c. power supplied to set 10 is 48 volts maximum, the actual voltage supplied is dependent on the length of the transmission loop between set 10 and the central office. To compensate for a variable drop in voltage from maximum value due to variation in the length of such loop, the d.c. voltage across terminals 63a, 63b is applied to the constant current transistor circuit 65 which operates to tend to hold constant the d.c. current flowing through multistage semiconductor amplifier 85 between junction 75 and quad output terminal 63b. The moving of switch 20 to ON position thus serves to energize the voice network 60 with d.c. power which is compensated for variation due to the length of the loop between set 10 and the central office.

The drawing of such d.c. power by voice network 60 over telephone lines 15 from the central office constitutes a signal to that office that the user of set 10 has reacted to the warble "rings" heard by moving switch 20 from OFF to ON position so as to discontinue the ringing mode of the set and to place it in voice mode. The telephone equipment at the office responds to such signal to discontinue forthwith the sending of ringing signals to set 10 and to complete the switching at the office necessary to place in voice communication with the user of set 10 the party initiating the call to that user.

Another effect of the moving of switch 20 to ON position is to close movable contact 36 with fixed contact 39b to thereby couple transducer 30 to the input terminals 86a, 86 of the amplifier 85. When set 10 is in its voice mode, electrical voice-representative signals transmitted over lines 15 to set 10 will be passed through voice network 60 as a.c fluctuations on the d.c. power energizing that network to be applied solely as a.c. current (because of the d.c. blocking of capacitor 83) to receiver transducer 25. That transducer responds to the passage through its coil of such a.c. current to convert the incoming voice-representative signals into corresponding voice sounds emitted by receiver 30.

Also during such voice mode of operation of set 10, the voice of the user of the set is converted by magnetic transducer 30 (operating as an active a.c. signal source) into voice-representative electric signals applied to amplifier 85, the transducer now acting as an acoustoelectric transducer. Amplifier 85 responds to such signals to cause the development in the flow of current through transistor 70 of fluctuations corresponding to such signals most of the energy of such fluctuations is fed back from circuit 65 through polarity quad circuit 61, switch 20 and cord 12 to telephone lines 11 as outgoing voice-representative electrical signals from set 10. Some, however, of the energy of such fluctuations is supplied via side tone limiting circuit 80 to receiver 25 to be reproduced as sound by such receiver.

When the user of set 10 and the party calling that user have completed their telephone conversation, the user actuates snap-action switch 20 to return it to its first or OFF position. The set 10 is thus placed in ringing mode to respond as described to subsequent ringing signals from the central office. If the user should forget to move switch 20 to OFF, the central office will detect the ensuing lack over a time interval of voice signals transmitted to and from the set, and the office will then send to set 10 a warning signal which will be emited by its receiver as a tone alerting the user that he or she has not properly repositioned switch 20. Of course, the user of set 10 may at any time initiate an outgoing call by moving switch 20 from OFF to ON and then using dial assembly 16 to dial the number desired.

Some advantages of what has been described above are as follows.

If, while the telephone is in the ringing mode, the user of the set should place the set's receiver to his/her ear and the central office should then send a ringing signal to the set, since the consequent ringing tone produced by the set is emitted by its transmitter rather than its receiver, damage to the ear of the user is avoided without need for a special protective device to achieve that result.

The transmitter 30 could of course be permanently connected, on the one hand, with the output of the ringing oscillator 43 and, on the other hand, with the input to the semiconductor amplifier 85. With such arangement, however, the relatively low impedance of the ringing oscillator would appear in shunt with transmitter 30 to tend to attenuate the output of the transmitter when being used as an acoustoelectric transducer, and to unnecessarily load the input to amplifier 85. Also, a ringing tone produced by the ringing oscillator would tend to be transmitted through amplifier 85 to actuate receiver 25 to produce a ringing tone, a result which is not preferred. Such problems are avoided by the proivision by switch 20 of its switch section 37 whereby the ringing oscillator is isolated from the voice network but the transmitter 30 may be selectively connected to one or the other.

The output of the ringing oscillator has an impedance of only a few hundred ohms whereas the input to amplifier 85 has an impedance of tens of thousands of ohms. If transmitter 30 were to have an impedance the same as that of receiver 25 (600 ohms), while the transmitter would have a relatively good impedance match with the ringing oscillator, the transmitter's impedance match with amplifier 85 would be poor and result in very inefficient power transfer between the transmitter and the amplifier. However, by having a value (for example, 3000 ohms) for the transmitter impedance which is substantially higher than the receiver impedance value (for example, 300 ohms), an optional compromise is attained between having the transmitter impedance match well with, respectively, the output of ring oscillator 43 and the input of amplifier 85.

The foregoing advantages can be attained according to the invention in a telephone set whether it is a switch-hookless telephone set (as described in detail herein) or a more conventional set comprising a base, cradle, switch hook and handset.

Coming now to the advantages specific to the described switch-hookless set, it is much less expensive than a conventional set and is highly portable so that it can be carried from room to room to be pluggable into modular telephone jacks at different locations as desired. The use in such a switch-hookless set of the described bistable switch (i.e., one which is firmly stable in either of two predetermined switch positions) is advantageous as compared to a switch which is biased by gravity, spring means or the like to only one position at which it is stable. That is so because such a biased switch in a switch-hookless set would have to be biased to the switch position placing the set in its ringing mode of operation, but in such case, provision would have to be made to hold the switch against its bias, either by a finger of the set user or otherwise, in the switch position providing voice mode of operation of the set all during the interval of a phone conversation. The requirement, however, that the switch be so held against its bias all during such interval would make for inconvenience.

In connection with the bistable switch described herein, its low cost is another advantage, and the fact that it has a snap-action assures that the switch when manipulated will assume one of its two predetermined stable switch positions and not some intermediate position.

As a further consideration, the described arrangement for using a transducer both as a telephone transmitter and as a ringer is particularly advantageous in a switch-hookless set because it eliminates the need for providing a separate ringer within the set's housing where space is at a premium.

The above-described embodiment being exemplary only, it is to be understood that omissions therefrom, additions thereto and modifications thereof can be made without departing from the spirit of the invention. For example, receiver 25 need not be a transducer of the magnetic type. Further, for example, element 30 need not be a transducer of the magnetic type so long as that element is capable of functioning either as an acoustoelectric transducer or as an electroacoustic transducer.

Accordingly, the invention is not to be considered as limited save as is consonant with the scope of the following claims.

What is claimed is:

1. The improvement in a telephone set adapted to be connected over telephone lines to a central office and comprising: a ringing network operable by a.c. power supplied by a ringing signal sent over said lines from said office, such network including a ringing oscillator responsive to such signal to generate an electrical tone signal, a receiver responsive to first electrical voice-representative signals incoming from said lines to convert such signals into audible voice sounds, a transducer operable as a transmitter during voice mode operation of said set to convert voice sounds into second electrical voice-representative signals for outgoing transmission over said lines, and a voice network for passing said first signals from said lines to said receiver and said second signals from said transducer to said lines, said improvement comprising: circuit means for connecting said ringing oscillator and magnetic transducer in a circuit for applying said tone signal from said oscillator to said transducer during ringing mode operation of said set, said transducer being responsive to such tone signal to reverse its normal role as a transmitter so as to convert such electrical tone signal into ringing sounds audible from such transducer.

2. The improvement according to claim 1 in which said set further comprises a switch movable between first and second predetermined switch positions to enable said ring oscillator and transducer to produce, and to disable said ring oscillator and transducer from producing, said ringing sounds when said switch is in, respectively, said first position and said second position.

3. The improvement according to claim 2 in which said switch includes a switch section interposed between said lines and said ringing and voice networks to connect said ringing network to, and disconnect said voice network from, said lines when said switch is in said first position, and to effect the converse when said switch is in said second position.

4. The improvement according to claim 2 in which said switch includes a switch section interposed between said transducer and said ringing and voice networks to connect said transducer by way of said circuit to said ringing oscillator when such switch is in said first position while concurrently disconnecting said transducer from said voice network, and to effect the converse when said switch is in said second position.

5. The improvement according to claim 2 in which said switch is a manually positionable bistable switch adapted when moved to either of said first and second positions to remain stably in that position.

6. The improvement according to claim 5 in which said telephone set is a switch-hookless telephone set having a housing in the configuration of a handset housing, and in which are housed all the aforesaid elements of said set, said set having further a telephone cord and a plug therein insertable into a telephone jack for connecting such set to said telephone lines.

7. The improvement according to claim 4 in which said transducer has a higher impedance than said receiver, said voice network includes a multistage semiconductor amplifier for amplifying said second signals produced by said transducer, and said switch is operable when in said first and second position to isolate the impedance of said transducer from the shunting effect thereacross of respectively, the impedance of said circuit apart from said transducer and the input impedance of said amplifier.

8. The improvement according to claim 2 in which said switch includes a first switch section interposed between said lines and said ringing and voice networks to connect said ringing network to, and disconnect said voice network from, said lines when said switch is in said first position, and to effect the converse when said switch is in said second position, and in which said switch further includes a second switch section interposed between said magnetic transducer and said ringing and voice networks to connect said transducer by way of said circuit to said ringing oscillator when such switch is in said first position while concurrently disconnecting said transducer from said voice network, and to effect the converse when said switch is in said second position.

9. The improvement according to claim 5 in which said bistable switch is a snap-action switch.

10. A switch-hookless telephone set comprising a housing having the configuration of a handset housing, a cord coupled at one end to said housing, a modular plug on the free end of said cord, said cord having therein tip and ring leads terminating at one end in said housing and at the other end in a connection with said plug, a receiver disposed in said housing and responsive to incoming first electrical voice-representative signals on said leads to convert such signals into audible voice sounds, a transducer disposed in said housing and operable as a transmitter during voice mode operation of said set to convert voice sounds into second electrical voice-representative signals for outgoing transmission over said leads, a ringing network disposed in said housing and including a ringing oscillator, a voice network disposed in said housing and operable during voice mode operation of said set to pass said first signals from said leads to said receiver and said second signals from said transducer to said leads, and a bistable switch in said housing and having an actuating button on the outside of said housing, said switch being movable between first and second predetermined switch positions at which said switch is stably positioned and at which, respectively, said set is placed in ringing mode of operation and voice mode of operation, said switch being adapted when in said first position to connect said ringing network to said leads while effectively disconnecting said receiver therefrom and to connect said transducer in circuit with said ringing oscillator while effectively disconnecting said transducer from said receiver, and said switch being adapted when in said second position to disconnect said ringing network from said leads while connecting said voice network thereto, and to disconnect said transducer from said ringing oscillator while connecting said transducer to said voice network.

11. A telephone set comprising, leads for connecting said set to a telephone network, a ringing network including a ringing oscillator, a receiver for converting incoming voice-representative signals on said leads into audible sounds, a transducer for converting audible sounds into voice-representative signals, a voice network for passing incoming voice representative signals on said leads to said receiver and voice-representative signals from said transducer to said leads, and a switch movable between first and second switch positions and coupled with said networks and said transducer so as, when in said first position, to connect said ringing network to, and to disconnect said voice network from, said leads while connecting and disconnecting said transducer to and from, respectively, said ringing oscillator and said voice network, and so as, when in said second position, to effect the converse connections and disconnections, said transducer when connected to said ringing oscillator being responsive to tone signals therefrom to emit ringing sounds.

* * * * *